(No Model.)
W. R. WHITE.
GATE.
No. 307,694. Patented Nov. 4, 1884.
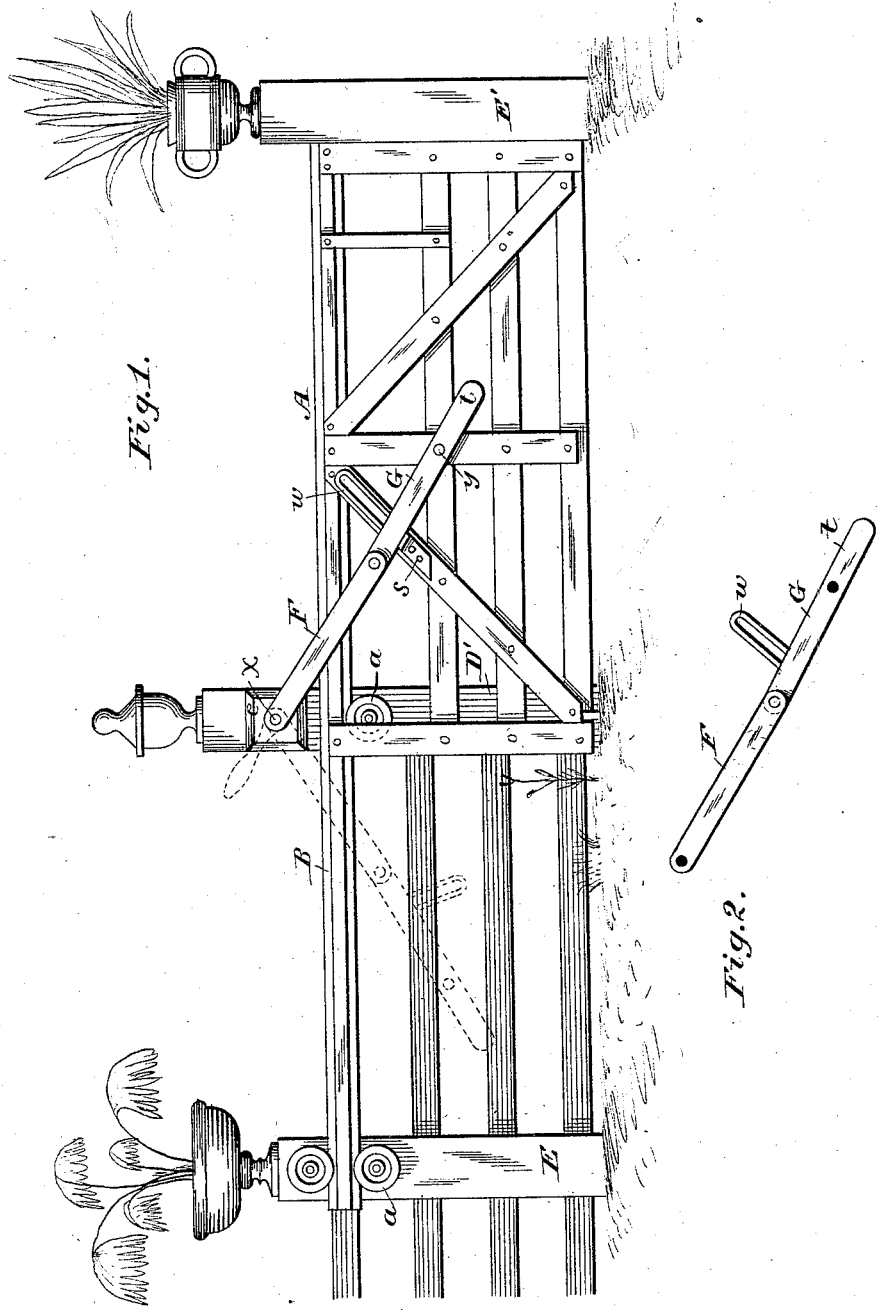
Attest:
Court A Cooper
Josephine Campbell
W. R. White
Inventor:
By Foster & Freeman
Attys

UNITED STATES PATENT OFFICE.

WILLIAM RICHARD WHITE, OF VINCENNES, INDIANA.

GATE.

SPECIFICATION forming part of Letters Patent No. 307,694, dated November 4, 1884.

Application filed June 16, 1883. (No model.)

*To all whom it may concern:*

Be it known that I, WILLIAM R. WHITE, a citizen of the United States, and a resident of Vincennes, in the county of Knox and State of Indiana, have invented certain new and useful Improvements in Gates, of which the following is a specification.

My invention relates to that class of gates which are supported and guided so as to move longitudinally across the opening of passages to be closed; and it consists, chiefly, in the combination, with a sliding gate, of connected levers, one pivoted to the side of the gate and the other to a stationary support having a lug or projection, the pivot-points being arranged to bring the levers into line diagonal to and in a plane parallel with the face of the gate in reversed positions when the gate is opened and closed, substantially as described hereinafter.

In the drawings, Figure 1 represents a side view of the gate illustrating my improvement, and Fig. 2 is a side view showing the arm or loop attached to part of the gate.

The gate A is provided with an upper rail, B, prolonged at the rear end, so as to afford a bearing, both when the gate is open and closed, upon the bearing wheels or rollers $a$, secured to the sides of posts E D', so that the gate may be carried to and from the closing-post E'. Any other means, however, of supporting the gate so that it will slide back and forth longitudinally may be adopted.

To facilitate the moving of the gate I employ the jointed levers F G, connected at their inner ends, the upper lever, F, being pivoted at its upper end by a bolt, $x$, to a stud or projection, $e$, upon the central post, D', while the lower lever, G, is pivoted by a pin, $y$, to the side of the gate at a point a short distance from the end of the lever. The levers are so constructed and pivoted that they may be brought to any desired angle to each other; but a stud, $s$, in the side of the gate maintains the levers nearly in line when the gate is closed, as shown in the drawings, the angle of the levers being then such that any attempt to open the gate will cause the levers to bear more firmly upon the stud, which, limiting the movement of the levers, will hold the gate in its position. To open the gate a downward pressure is applied by means of a hand or foot upon the projecting end $t$ of the lever G, which will result in raising the upper end of the said lever and in forcing back the gate, which will move easily upon its rollers and quickly take a position upon the opposite side of the post D', the levers then being in the position shown by dotted lines.

The gate may be closed by bearing smartly upon either lever or upon both at their point of junction with a downward pressure, and after the gate is locked against the post E' the levers will assume a position in contact with the stud $s$, as shown, and will then be locked.

Instead of projecting the lower end of the lever G, the upper end of the lever F may be extended, as shown in dotted lines, and will serve as a handle to quickly depress this end of the lever with the same result as will be obtained by pressing downward the end $t$ of the lever G.

It will be seen that the device described for opening and closing the gate is an extremely simple one, capable of being constructed and applied by a mechanic of any ordinary skill, and that it serves the purpose of an opening device and a lock.

The gate illustrated is shown as a partition or fence gate; but the same devices may be used for road or yard gates, in which cases appliances may be used for operating the levers by devices accessible from vehicles or horseback.

It will be apparent that the levers may be pivoted to any part of the gate that may be found desirable.

The gate thus constructed may be used in connection with the devices described in my Letters Patent of May 23, 1882, by prolonging the post D', to support the operating levers and rod shown in said patent. An arm, $w$, (shown in the form of a metal loop or staple,) is connected to one of the levers F G, so as to permit the latter to be turned upward by a person upon horseback.

I am aware of Patents Nos. 251,202 and 272,646, and make no claim to the subject-matter of said patents.

I claim—

1. The combination, with the central gate-post provided with a laterally-extending stud or projection, of the jointed levers, one being pivoted to the stud or projection and the other to the side of the gate, as described, the pivot-points being arranged to bring the levers into line diagonal to and in a plane parallel with the face of the gate in reversed positions when the gate is opened and closed.

2. The combination of a sliding gate, connected levers F G, pivoted one to the gate and the other to a stationary support, the end $t$ of one of the levers being prolonged beyond the pivot-point, for the purpose specified, and an arm near the joint, as and for the purpose set forth.

3. The combination of the sliding gate, the levers, pivoted one to the gate and the other to a stationary support, the pivot-points being arranged to bring the levers into line diagonal to the gate when the latter is opened and diagonal thereto in reversed positions when closed, and stop $s$, for the purpose specified.

4. The combination of the sliding gate, levers F G, pivoted as described, and arm $w$ upon one of the levers, for the purpose set forth.

In testimony whereof I have signed my name to this specification in the presence of two subscribing witnesses.

WILLIAM RICHARD WHITE.

Witnesses:
NATHAN B. HASKETT,
M. E. HASKETT.